(12) United States Patent
Taniguchi et al.

(10) Patent No.: US 8,796,897 B2
(45) Date of Patent: Aug. 5, 2014

(54) CONSEQUENT POLE PERMANENT MAGNET MOTOR

(75) Inventors: Makoto Taniguchi, Obu (JP); Asuka Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 503 days.

(21) Appl. No.: 13/105,193

(22) Filed: May 11, 2011

(65) Prior Publication Data

US 2011/0278978 A1  Nov. 17, 2011

(30) Foreign Application Priority Data

May 11, 2010  (JP) .................................. 2010-109529

(51) Int. Cl.
*H02K 1/27* (2006.01)
(52) U.S. Cl.
USPC ................................ 310/156.54; 310/156.52
(58) Field of Classification Search
USPC ............. 310/156.51, 156.53, 156.54, 156.55, 310/156.52, 156.49, 156.59, 156.61, 156.15
IPC ........................................................ H02K 1/27
See application file for complete search history.

(56) References Cited

U.S. PATENT DOCUMENTS

| | | | | |
|---|---|---|---|---|
| 5,631,512 A | * | 5/1997 | Kawabata et al. | ........ 310/156.15 |
| 6,903,478 B2 | * | 6/2005 | Dobashi et al. | ............... 310/184 |
| 2002/0180295 A1 | * | 12/2002 | Kaneda et al. | ........... 310/156.43 |
| 2008/0290753 A1 | * | 11/2008 | Arimitsu et al. | ......... 310/156.36 |
| 2009/0224623 A1 | * | 9/2009 | Saito et al. | ............... 310/156.53 |
| 2011/0148240 A1 | * | 6/2011 | Koide et al. | ............... 310/156.54 |
| 2011/0193440 A1 | * | 8/2011 | Yamada et al. | ........... 310/156.54 |
| 2011/0278978 A1 | * | 11/2011 | Taniguchi et al. | ....... 310/156.54 |

FOREIGN PATENT DOCUMENTS

| | | | |
|---|---|---|---|
| CN | 1433122 | 7/2003 | |
| CN | 1697288 | 11/2005 | |
| CN | 101527475 | 9/2009 | |
| JP | 09-327139 | * 12/1997 | ............... H02K 1/27 |
| JP | 2004-357489 | 12/2004 | |

OTHER PUBLICATIONS

Office Action (7 pages) Apr. 24, 2013, issued in corresponding Chinese Application No. 201110126475.1 and English translation (12 pages).

* cited by examiner

*Primary Examiner* — Burton Mullins
(74) *Attorney, Agent, or Firm* — Nixon & Vanderhye, P.C.

(57) ABSTRACT

In a motor, an armature is provided to be opposite to a rotor member for generating a rotating magnetic field. In the armature, plural sets of teeth are arranged in a direction of rotation of the rotor member such that each set of teeth in the plural sets of teeth is within one electrical angular cycle of the rotating magnetic field. The one electrical angular cycle corresponds to one pole-pair pitch of the annular rotor member. A number of teeth in the plurality of teeth within the one pole-pair pitch is set to 2k (k is a natural number), and a number of teeth facing each of the first magnetic poles in the plurality of teeth is set to be equal to or greater than the sum of k and 1.

15 Claims, 9 Drawing Sheets

| INDEX NUMBER | MECHANICAL ANGLE | ELECTRICAL ANGLE |
|---|---|---|
| 1 | 30 | 150 |
| 2 | 60 | 300 |
| 3 | 90 | 90(450) |
| 4 | 120 | 240(600) |
| 5 | 150 | 30(750) |
| 6 | 180 | 180(900) |
| 7 | 210 | 330(1050) |
| 8 | 240 | 120(1200) |
| 9 | 270 | 270(1350) |
| 10 | 300 | 60(1500) |
| 11 | 330 | 210(1650) |
| 12 | 360 (0) | 360(1800) (0) |

| INDEX NUMBER | MECHANICAL ANGLE | ELECTRICAL ANGLE |
|---|---|---|
| 1 | 6 | 30 |
| 2 | 12 | 60 |
| 3 | 18 | 90 |
| 4 | 24 | 120 |
| 5 | 30 | 150 |
| 6 | 36 | 180 |
| 7 | 42 | 210 |
| 8 | 48 | 240 |
| 9 | 54 | 270 |
| 10 | 60 | 300 |
| 11 | 66 | 330 |
| 12 | 72 | 360 |
| 13 | 78 | 30 (390) |
| 14 | 84 | 60 (420) |
| 15 | 90 | 90 (450) |
| ⋮ | ⋮ | ⋮ |
| 60 | 360(0) | 360(1800)(0) |

US 8,796,897 B2

CONSEQUENT POLE PERMANENT MAGNET MOTOR

CROSS REFERENCE TO RELATED APPLICATIONS

This application is based on Japanese Patent Application 2010-109529 filed on May 11, 2010. This application claims the benefit of priority from the Japanese Patent Application, so that the descriptions of which are all incorporated herein by reference.

TECHNICAL FIELD

The present disclosure relates to consequent pole permanent magnet motors for use in, for example, motor vehicles, such as hybrid vehicles and electric vehicles; these motors are comprised of a soft magnetic rotor with a plurality of consequent poles and with a plurality of permanent magnet poles.

BACKGROUND

Motors using rare-earth permanent magnets with high magnetic performance are actively used for various devices. On the other hand, in view of the exhaustion of the earth's resources, motors designed to reduce the usage of rare-earth permanent magnets to a minimum are being studied.

Japanese Patent Application Publication No. 2004-357489 discloses a motor with a consequent pole rotor as an example of the latter type of motors; this motor will be also referred to as a "consequent pole motor".

The consequent pole motor disclosed in the patent Publication is comprised of a plurality of permanent magnet poles with the same magnetic polarity, such as the north or south pole, in the outer periphery of a cylindrical soft magnetic rotor. The cylindrical soft magnetic rotor is designed as a consequent pole rotor to have a plurality of radially outwardly projections disposed respectively between the plurality of permanent magnet poles so that the magnetic polarities of the plurality of permanent magnet poles cause the plurality of projections to be consequently magnetized as the same magnetic polarity opposite to the magnetic polarity of the plurality of permanent magnet poles. Such a consequent pole motor includes a number of permanent magnet poles, which is half that of the permanent magnet poles of normal permanent magnet motors, thus maintaining its magnetic performance with reduction in the number of the permanent magnet poles.

On the other hand, concentrated winding motors are mainly used for various devices. 12-slot, 10-pole motors with concentrated winding or 12-slot, 14-pole motors with concentrated winding, which have a relatively high winding factor, have been proposed in order to limit the deterioration in magnetic performance of these motors.

Figure 9:
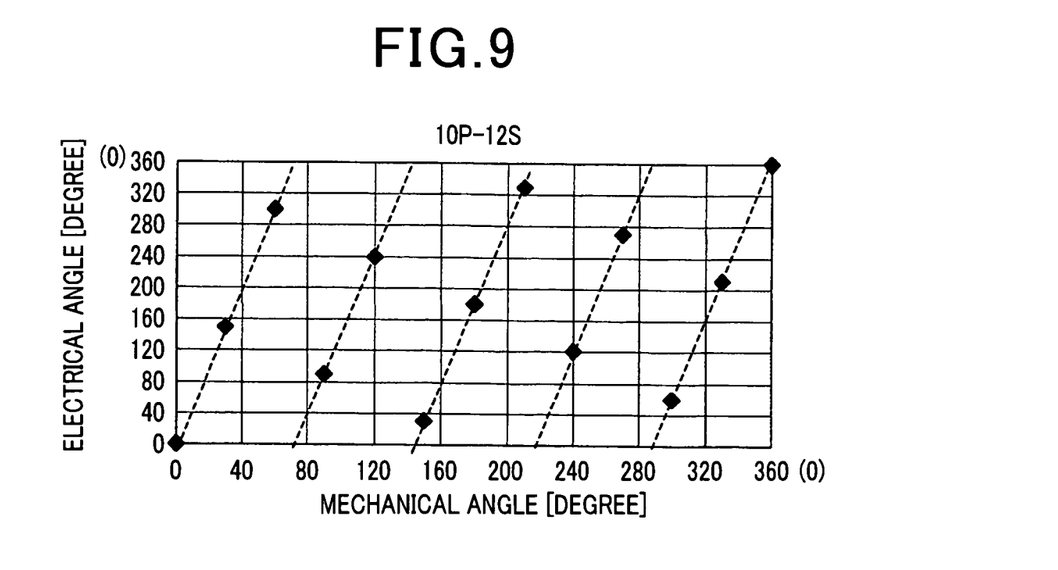
FIG. 9 is a table schematically illustrating a correlation between electrical angles of teeth of the armature of a 12-slot, 10-pole motor and mechanical angles of the corresponding teeth per rotation of 360 mechanical angle of the 10-pole rotor assuming that one of the teeth is a reference tooth at the electrical angle and mechanical angle of 0.
Figure 10:
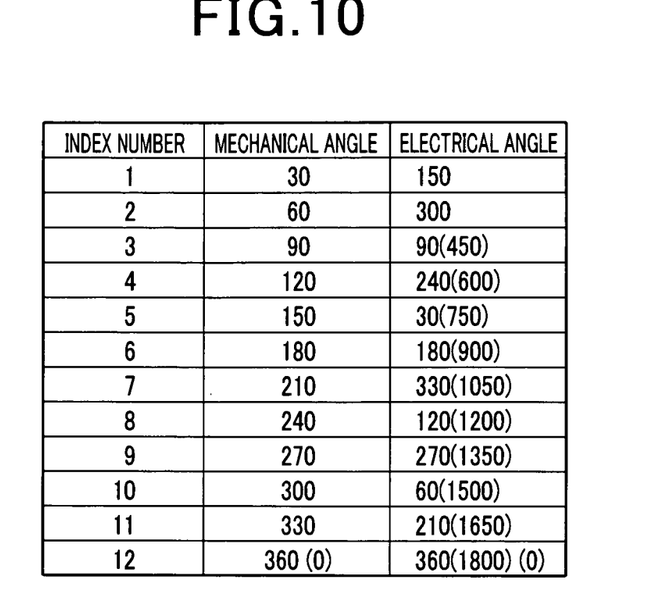
FIG. 10 is a table schematically illustrating a correlation between: index numbers assigned to the teeth from the tooth adjacent to the reference tooth in a counterclockwise direction to the reference tooth of the 12-slot, 10-pole motor, electrical angles of the corresponding teeth of the armature of the 12-slot, 10-pole motor, and mechanical angles of the corresponding teeth.

For example, FIG. 9 is a table schematically illustrating a correlation between electrical angles of teeth of the armature of a 12-slot, 10-pole motor and mechanical angles of the corresponding teeth per rotation of 360 mechanical angle (equal to 1800 electrical angle) of the 10-pole rotor assuming that one of the teeth is a reference tooth at the electrical angle and mechanical angle of 0, FIG. 10 is a table schematically illustrating a correlation between: index numbers 1, 2, ..., 12 assigned to the teeth from the tooth adjacent to the reference tooth in a counterclockwise direction to the reference tooth of the 12-slot, 10-pole motor, electrical angles of the corresponding teeth 1, 2, ..., 12 of the armature of the 12-slot, 10-pole motor, and mechanical angles of the corresponding teeth 1, 2, ..., 12. As illustrated in FIGS. 9 and 10, one cycle of the rotating magnetic field created by armature currents corresponds to 360 electrical degrees, and therefore, 0 electrical degrees is in agreement with 360 electrical degrees.

SUMMARY

These 12-slot, 10-pole motors or 12-slot, 14-pole motors use normal permanent magnet rotors, which remains risks of exhaustion of the earth's resources. For addressing these risks, the inventors tried to apply a consequent pole rotor to a 12-slot, 10-pole motor, and carried out experiments to explore the characteristics of the 12-slot, 10-pole motor with the consequent pole rotor. The results of the experiments show that radial vibration in the 12-slot, 10-pole motor is increased to cause noise as compared with 12-slot, 10-pole motors with a normal permanent magnet rotor.

The inventors pinpointed that one of the factors in this increase in radial vibration was that there is mismatching between the pole pair number of 5 of the consequent pole rotor of the 12-slot, 10-pole motor and the pole pair number of 4 of the rotating magnetic field created by armature currents. Additionally, as illustrated in FIGS. 9 and 10, the inventors pinpointed that an alternative one of the factors in this increase in the radial vibration was that there are not any teeth that take a same electrical degree per rotation of 360 mechanical angle of the 10-pole rotor. That is, there is no repeatability of electrical degree that a tooth takes per rotation of 360 mechanical angle of the 10-pole rotor.

In order to reduce such increased radial vibration, the inventors have designed a consequent pole motor having repeatability of electrical degree that a tooth takes per rotation of 360 mechanical angle of the rotor, such as a 60-slot, 10-pole motor having a consequent pole rotor and a full-pitch distributed winding armature. The 60-slot, 10-pole motor with the consequent pole rotor and the full-pitch distributed winding armature, which will be referred to simply as a 60-slot, 10-pole motor, has five pole-pairs of the rotating magnetic field created by armature currents; this five pole-pairs is in agreement with five pole-pairs of the consequent pole rotor.

Figure 11:
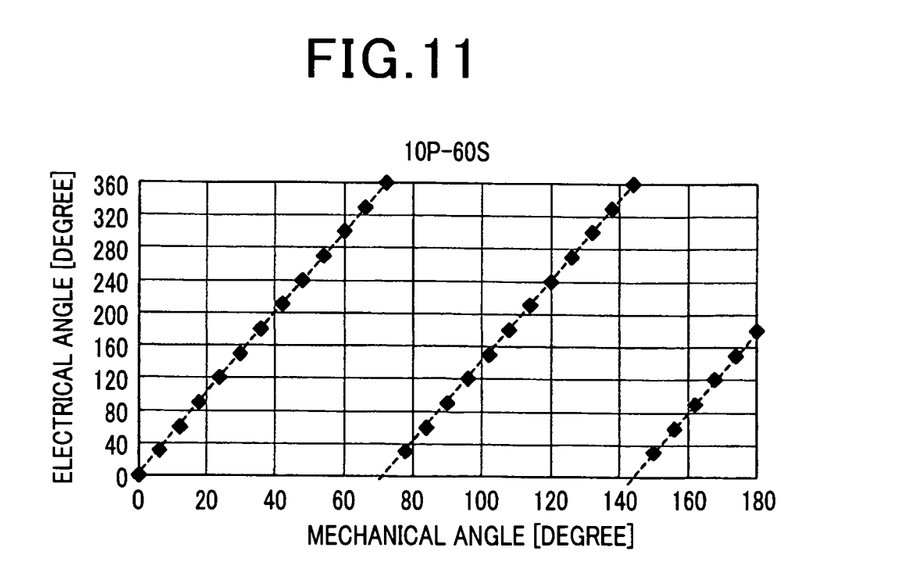
FIG. 11 is a table schematically illustrating a correlation between electrical angles of teeth of the armature of such a 60-slot, 10-pole motor, and mechanical angles of the corresponding teeth per rotation of 360 mechanical angle of the consequent pole rotor assuming that one of the teeth is a reference tooth at the electrical angle and mechanical angle of 0.
Figure 12:
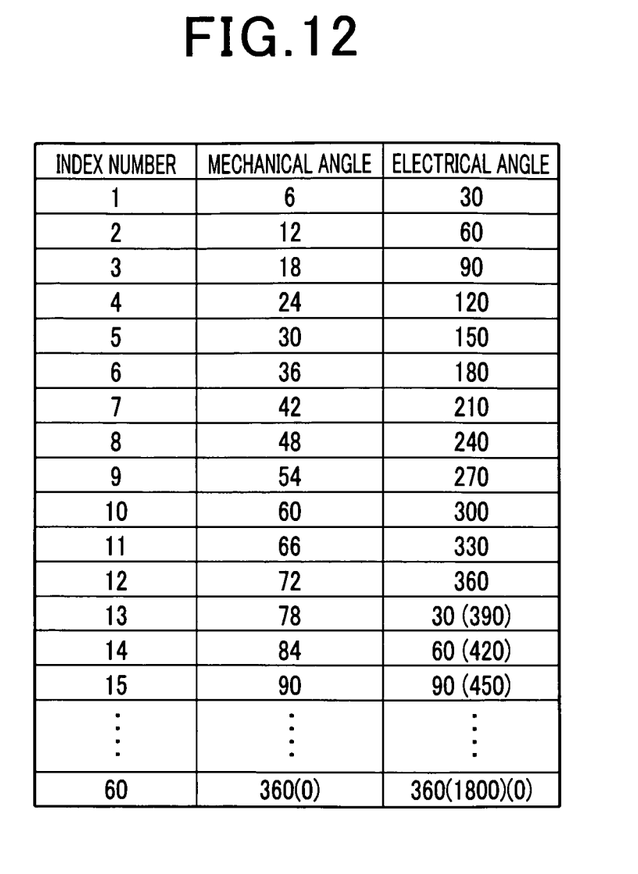
FIG. 12 is a table schematically illustrating a correlation between: index numbers assigned to the teeth from the tooth adjacent to the reference tooth in a counterclockwise direction to the reference tooth of the 60-slot, 10-pole motor, electrical angles of the corresponding teeth of the armature of the 60-slot, 10-pole motor, and mechanical angles of the corresponding teeth.

Specifically, FIG. 11 is a table schematically illustrating a correlation between electrical angles of teeth of the armature of such a 60-slot, 10-pole motor, and mechanical angles of the corresponding teeth per rotation of 360 mechanical angle (equal to 1800 electrical angle) of the consequent pole rotor assuming that one of the teeth is a reference tooth at the electrical angle and mechanical angle of 0. FIG. 12 is a table schematically illustrating a correlation between: index numbers 1, 2, ..., 60 assigned to the teeth from the tooth adjacent to the reference tooth in a counterclockwise direction to the reference tooth of the 60-slot, 10-pole motor, electrical angles of the corresponding teeth 1, 2, ..., 60 of the armature of the 60-slot, 10-pole motor, and mechanical angles of the corresponding teeth 1, 2, ..., 60. As illustrated in FIGS. 11 and 12, one cycle of the rotating magnetic field created by armature currents corresponds to 360 electrical degrees, and therefore, 0 electrical degrees is in agreement with 360 electrical degrees.

Generally, for a consequent pole motor, it is important to magnetize each consequent pole to a level close to the saturation flux density of the material of a corresponding consequent pole in view of improvement of the magnetic performance, in other words, to achieve the amount of magnetic flux to a level that allows each consequent pole to be saturated.

In this regard, a consequent pole of a consequent pole motor is consequently magnetized through a magnetic circuit in which magnetic flux generated from a magnet pole returns to the consequent pole through corresponding teeth opposite to the magnet pole. In addition, the saturation flux density of the material of consequent poles is higher than that of the material of magnet poles.

For this reason, if such a consequent pole motor having an armature with full-pitch distributed winding were designed, just like conventional consequent pole motors, such that the number of teeth of the armature opposite to each magnet pole is identical to that of teeth opposite to each consequent pole, it would be difficult to obtain the amount of magnetic flux generated from each magnet pole to a level that allows each consequent pole to be saturated because the amount of the magnetic flux generated from each magnet pole depends on the surface area of a corresponding magnet pole opposite to the corresponding teeth.

An increase in the surface area of each magnet pole opposite to the corresponding teeth would increase the diameter of the consequent pole motor. This would result in an increase in size of the consequent pole motor, increasing the consequent pole motor in cost.

An installation of such a large-sized consequent pole motor in motor vehicles would thus deteriorate the cost competitiveness of the motor vehicles.

In view of the circumstances set forth above, an aspect of the present disclosure seeks to provide consequent pole permanent magnet motors designed to solve at least one of the problems set forth above.

Specifically, an alternative aspect of the present disclosure aims to provide such motors capable of balancing: an increase in the amount of magnetic flux generated from permanent magnets of the motors for magnetizing consequent poles, and a reduction in size of the motors.

According to an alternative aspect of the present disclosure, there is provided a motor including an annular rotor member made of a soft magnetic material and rotatably provided in the motor. The rotor member includes a plurality of first magnetic poles arranged in a circumferential direction of the rotor member at spaces therebetween. Each of the plurality of first magnetic poles is formed by an outer peripheral portion of the rotor member and a permanent magnet. The rotor member includes a plurality of second magnetic poles radially extending from the rotor member and respectively arranged between the plurality of first magnetic poles. The plurality of second magnetic poles are consequently magnetized as a plurality of consequent poles by the plurality of first magnetic poles. The motor includes an armature provided to be opposite to the rotor member for generating a rotating magnetic field. The armature includes plural sets of teeth, arranged in a direction of rotation of the rotor member such that each set of teeth in the plural sets of teeth is within one electrical angular cycle of the rotating magnetic field. The one electrical angular cycle corresponds to one pole-pair pitch of the annular rotor member. A number of teeth in the plurality of teeth within the one pole-pair pitch is set to 2k (k is a natural number), and a number of teeth facing each of the first magnetic poles in the plurality of teeth is set to be equal to or greater than the sum of k and 1.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Embodiments of the present disclosure will be described hereinafter with reference to the accompanying drawings. In the drawings, identical reference characters are utilized to identify corresponding identical components. Note that, in order to simply illustrate the structure and operations of the embodiments, hatching is omitted in illustration in some of the accompanying drawings.

First Embodiment

Figure 1A:
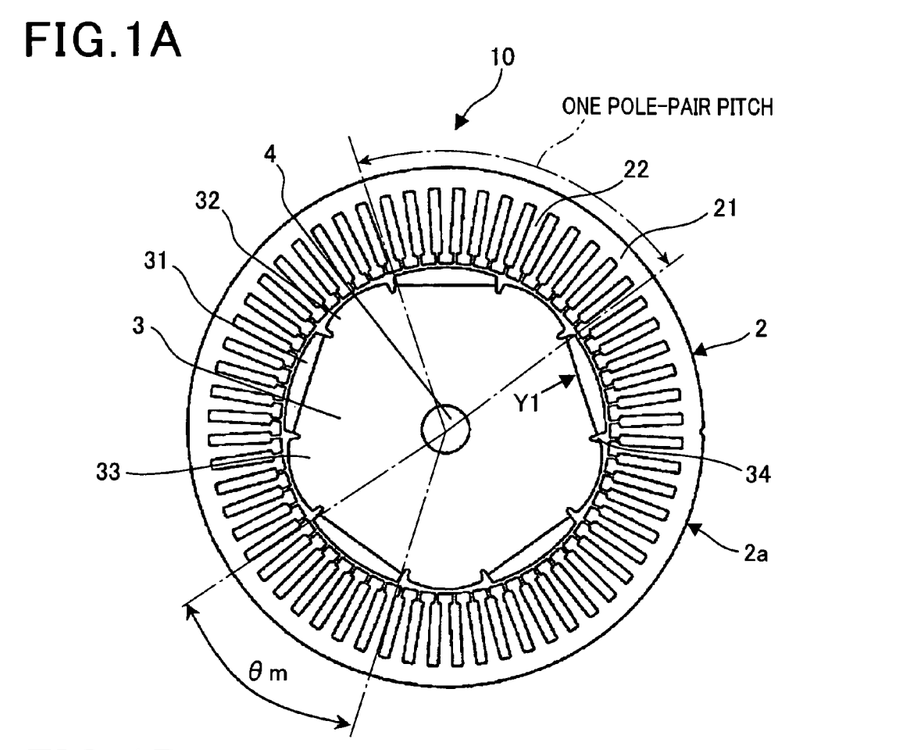
FIG. 1A is a lateral cross sectional view of a three-phase, 60-slot, 10-pole motor according to the first embodiment of the present disclosure.
Figure 1B:
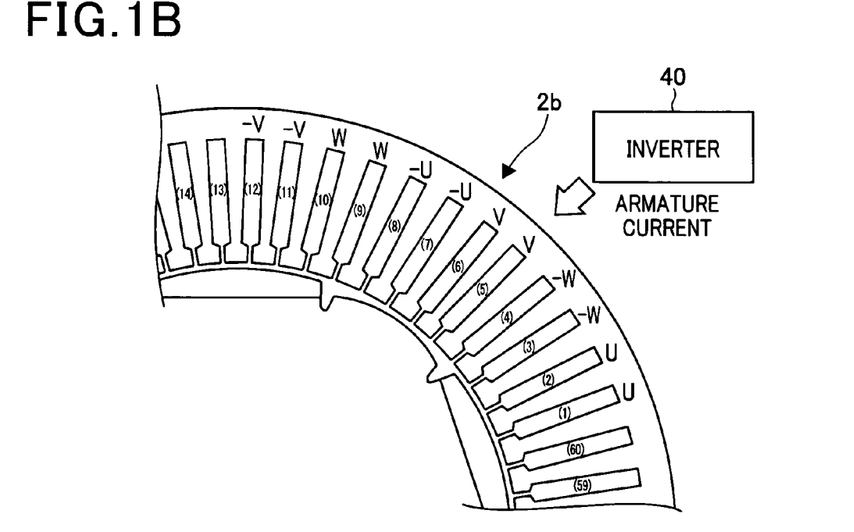
FIG. 1B is an enlarged cross sectional view of a part of the motor illustrated in FIG. 1A.

Referring to the drawings, particularly to FIGS. 1A and 1B, there is illustrated a three-phase, 60-slot, 10-pole motor 10 with a substantially cylindrical shape, referred to simply as a "motor 10".

The motor 10 is comprised of an armature 2, a substantially annular rotor 3 provided to be opposite to the armature with a gap therebetween, and a rotary shaft 4 made of, for example, a nonmagnetic material, such as stainless steel.

The armature 2 includes a substantially annular armature core 2a. The armature core 2a consists of an annular yoke 21 and sixty teeth 22 radially inwardly projecting from the inner surface of the yoke 21. The sixty teeth 22 are circumferentially arranged at regular pitches therebetween. Spaces surrounded by circumferentially adjacent teeth and the yoke 21 provide sixty slots of the armature core 2a. The inner surfaces of the sixth teeth 22 provide the inner periphery of the armature core 2a.

The rotor 3 is made of a magnetic steel sheet as an example of soft magnetic materials, and is comprised of a substantially annular yoke (core) 32 with its inner periphery to which the rotary shaft 4 is fixed. The rotor 3 is comprised of five permanent magnet poles 31 made of, for example, rare-earth magnets containing, for example, neodymium and dysprosium. The five permanent magnet poles 31 have the same magnetic polarity, such as the north or south pole, and are mounted on the outer periphery of the yoke 32. The five permanent magnet poles 31 are circumferentially arranged at regular pitches therebetween.

The outer surface of each of the permanent magnet poles 31 is curved with a predetermined radius of curvature around the center axis of the rotary shaft 4.

The yoke 32 is provided with five radially outwardly extending projections 33 disposed respectively between the five permanent magnet poles 31 and circumferentially arranged at regular pitches. With the configuration of the rotor 3, the magnetic polarities of the five permanent magnet poles 31 cause the five projections 33 to be consequently magnetized as the same magnetic polarity opposite to the magnetic polarity of the five permanent magnet poles 31; these projections 33 will be therefore referred to as "consequent poles 33" hereinafter. The yoke 32 is comprised of spaces 34 between the permanent magnet poles 31 and the consequent poles 33; these spaces 34 serve as magnetic barriers between the permanent magnet poles 31 and the consequent poles 33. The outer surface of each of the consequent poles 33 is curved with a predetermined radius of curvature around the center axis of the rotary shaft 4.

The rotor 3 has one pole-pair pitch, that is, a pitch between adjacent same poles, of 72 mechanical degrees corresponding to 360 electrical degrees. As illustrated in FIGS. 1A and 1B, there are twelve teeth 22 of the armature core 2a within 72 mechanical degrees corresponding to one pole-pair pitch of the rotor 3. The 60-slot, 10-pole motor 10 according to the first embodiment is an example of the present disclosure. Specifically, a consequent pole permanent magnet motor according to the present disclosure is configured such that there are 2k teeth within a mechanical angle corresponding to one pole-pair pitch of the rotor 3; k is a natural number. In other words, because the 60-slot, 10-pole motor 10 is configured such that there are twelve teeth 22 within 72 mechanical degrees corresponding to one pole-pair pitch of the rotor 3, k is set to 6. Thus, the pitch between adjacent slots (teeth 22) of the armature core 2 is set to 30 electrical degrees, which is an integer submultiple of 60 electrical degrees (see FIGS. 11 and 12).

The armature 2 also includes three-phase armature windings 2b (see FIG. 1B) wound in the armature core 2a in distributed, full pitch winding configuration. As each of the three-phase armature windings 2b, the joint of a plurality of conductor segments each consisting of a pair of in-slot portions and a turn portion joining the paired in-slot portions or a continuous wire having a rectangular shape in its lateral cross section can be used.

For example, in one electric angular cycle (360 electrical degrees) of the armature care 2a, which corresponds to one pole-pair pitch of the rotor 3, including twelve slots (1), (2), ..., (12), a first U-phase coil is wound in the first slot (1) and the seventh slot (7), and a second U-phase coil is wound in the second slot (2) and the eighth slot (8). The first U-phase coil and the second U-phase coil are, for example, connected in series to provide the U-phase winding. Reference characters "U" and "−U" represent directions of an armature current (U-phase alternating current) flowing through each of the first and second U-phase coils. For example, the U-phase alternating current flowing through the portion of the first U-phase coil in the first slot (1) is opposite in direction to that flowing through the portion of the first U-phase coil in the seventh slot (7).

Similarly, in one electric angular cycle (360 electrical degrees) of the armature core 2a, a first V-phase coil is wound in the fifth slot (5) and the eleventh slot (11), and a second V-phase coil is wound in the sixth slot (6) and the twelfth slot (12). The first V-phase coil and the second V-phase coil are, for example, connected in series to provide the V-phase winding. Reference characters "V" and "−V" represent directions of an armature current (V-phase alternating current) flowing through each of the first and second V-phase coils. For example, the V-phase alternating current flowing through the portion of the first V-phase coil in the fifth slot (5) is opposite in direction to that flowing through the portion of the first V-phase coil in the eleventh slot (11).

In addition, in one electric angular cycle (360 electrical degrees) of the armature core 2a, a first W-phase coil is wound in the ninth slot (9) and the third slot (3), and a second W-phase coil is wound in the tenth slot (10) and the fourth slot (4). The first W-phase coil and the second W-phase coil are, for example, connected in series to provide the W-phase winding. Reference characters "W" and "−W" represent directions of an armature current (W-phase alternating current) flowing through each of the first and second W-phase coils. For example, the W-phase alternating current flowing through the portion of the first W-phase coil in the ninth slot (9) is opposite in direction to that flowing through the portion of the first W-phase coil in the third slot (3).

As well as the first set of the slots (1) to (12), U-, V-, and W-phase windings 2b are wound in each of: the second set of the slots (13) to (24), the third set of the slots (25) to (36), the fourth set of the slots (37) to (48), and the fifth set of the slots (49) to (60). In other words, the armature windings 2b are classified into: the first group of armature windings wound in the first set of the slots (1) to (12), the second group of armature windings wound in the second set of the slots (13) to (24), the third group of armature windings wound in the third set of the slots (25) to (36), the fourth group of armature windings wound in the fourth set of the slots (37) to (48), and the fifth group of armature windings wound in the fifth set of the slots (49) to (60).

The armature currents (U-, V-, and V-phase alternating currents) have a phase difference of 120 degrees; these armature currents are supplied from an inverter 40. Applying one cycle (360 electrical degrees) of the armature currents to the first group of armature windings creates one cycle (360 electrical degrees) of a rotating magnetic field. In other words, the magnetic field created by the armature currents supplied to each group of armature windings rotates by 360 electrical degrees corresponding to the mechanical angle of 75 degrees. Thus, applying the armature currents sequentially to the respective first to fifth groups of armature windings creates a continuous rotating magnetic field having five pole-pairs around the armature core 2a (360 mechanical degrees).

Each of the first and second U-phase coils, the first and second V-phase coils, and the first and second W-phase coils can be individually driven as two pairs of three-phase windings by a pair of inverters.

Magnetic interaction between the continuous rotating magnetic field and each of the poles (the permanent magnet poles 31 and consequent poles 33) of the rotor 3 creates torque to turn the rotor 3.

The motor 10 according to the first embodiment is specially designed such that the number of teeth 22 facing each permanent magnet pole 31 is set to seven equal to the sum of k and 1 and the number of teeth 22 facing each consequent pole 33 is set to five equal to the subtraction of 1 from k.

Particularly, in order to maximize interlinkage flux of the poles 31 and 33 of the rotor 3 to the armature windings 2b of the armature 2, the motor 10 is designed such that a circumferential electrical, angular width θm of each of the permanent magnet poles 31 is set to 207 electrical degrees, and a circumferential electrical angular width θc of each of the consequent poles 33 is set to 145 electrical degrees. Thus, a circumferential electrical angular width of each of the magnetic barriers 34 is set to 8 electrical degrees.

How to determine the circumferential electrical angular width κm of each of the permanent magnet poles 31 and the circumferential electrical angular width θc of each of the consequent poles 33 in order to maximize interlinkage flux of the poles 31 and 33 of the rotor 3 to the armature windings 2b of the armature 2 are as follows.

Specifically, in the first embodiment, as the material of each of the permanent magnet poles 31, a rare-earth magnet with residual flux density Br of 1.4 Tesla [T], and, as the material of the yoke 32 of the rotor 3, a magnetic steel sheet having a saturation flux density Bst of 1.9 [T]. Note that, for maximizing interlinkage flux of the poles 31 and 33 and the rotor 3 to the armature windings 2b of the armature 2, it is necessary to design the amount of magnetic flux passing through the permanent magnet poles 31 and the consequent poles 33 to its upper limit. The amount φm of magnetic flux generated from each permanent magnet pole 31 is proportional to the product of the circular angular width θm of a corresponding one permanent magnet pole 31 and the residual flux density Br, which is expressed as the following equation: $\phi m \propto \theta m \times Br$. Similarly, the amount of φs of magnetic flux generated from each consequent pole 33 is proportional to the product of the saturation flux density Bst and the subtraction of the circular angular width θm from 2Π, which is expressed as the following equation: $\phi s \propto (2\Pi - \theta m) \times Bst$.

In the first embodiment, because the material of each permanent magnet pole 31 with the residual flux density Br of 1.4 [T] and the material of each consequent magnet pole 33 with the saturation flux density Bst of 1.9 [T] are selected, a value of the circular angular width θm of each permanent magnet pole 31, which meets the equation of "φm=φs", is substantially calculated as 207 electrical degrees. As described above, because the magnetic barriers 34 are provided between the permanent magnet poles 31 and the consequent poles 33, the determination of the circumferential electrical angular width θm of each permanent magnet pole 31 to 207 electrical degrees determines the circular angular width θs of each consequent pole 33 to 145 electrical degrees.

As described above, the motor 10 according to the first embodiment includes plural sets of teeth 22 of the armature 2, each set of which includes multiphase armature windings. The plural sets of teeth 22 are arranged in the direction of rotation of the rotor 3 such that one set of teeth 22 of the plural sets of teeth 22 corresponds to one cycle of a rotating magnetic field generated when the multiphase armature windings of the one set of teeth 22 are energized; this one cycle of the rotating magnetic field corresponds to one pole-pair pitch of the rotor 3.

The motor 10 is also configured such that:

2k teeth are provide within a mechanical angle corresponding to one pole-pair pitch of the rotor 3; and the number of teeth 22 facing each permanent magnet pole 31 is set to be equal to or higher the sum of k and 1.

Particularly, the motor 10 is configured such that the number of teeth 22 facing each consequent pole 33 is set to be equal to or lower than the subtraction of 1 from k.

The configuration of the motor 10 set forth above increases the length of the outer surface of each permanent magnet pole 31 in the circumferential direction of the rotor 3 in comparison to a 60-slot, 10-pole motor whose number of teeth of the armature opposite to each magnet pole is identical to that of teeth opposite to each consequent pole by substantially 15 percent; this 15 percent is calculated by dividing 207 by 180.

Thus, it is possible to increase the amount of magnetic flux generated from each permanent magnet pole 31 of the motor 10 by substantially 15 percent in comparison to the amount of magnetic flux generated from each permanent magnet of a 60-slot, 10-pole motor whose number of teeth of the armature opposite to each magnet pole is identical to that of teeth opposite to each consequent pole.

In other words, if the amount of magnetic flux generated from each permanent magnet pole 31 of the motor 10 is designed to be in agreement with the amount of magnetic flux generated from each permanent magnet of a 60-slot, 10-pole motor (normal 60-slot, 10-pole motor) whose number of teeth of the armature opposite to each magnet pole is identical to that of teeth opposite to each consequent pole, the amount of permanent magnet materials to be used for the permanent magnet poles 31 of the motor 10 can be reduced as compared with the amount of permanent magnet materials to be used for the permanent magnet poles of the normal 60-slot, 10-pole motor. Otherwise, if the amount of magnetic flux generated from each permanent magnet pole 31 of the motor 10 is designed to be in agreement with the amount of magnetic flux generated from each permanent magnet of the normal 60-slot, 10-pole motor, it is possible to reduce the axial length of magnetic circuits between the armature 2 and the rotor 3, that is, the axial length of the motor 10 by 15 percent in comparison to the axial length of the normal 60-slot, 10-pole motor.

In addition, the motor 10 according to the first embodiment is configured such that there is only one permanent magnet pole in magnetic circuits generated between the armature 2 and the rotor 3 within one pole-pair pitch of the rotor 3. This reduces magnetic reluctance between the armature 2 and the rotor 3 in comparison to that of normal surface permanent magnet motors.

Because each consequent pole 33 is made of at least one soft magnetic material, the saturation flux density of each consequent pole 33 is greater than the residual flux density of each permanent magnet pole 31. Because the three-phase armature windings 2b are wound in the armature core 2a in distributed, full pitch winding, magnetic circuits generated between the armature 2 and the rotor 3 are passed over teeth 22 within one pole-pair pitch of the rotor 3. This allows five pole-pairs of the rotating magnetic field to be generated, which is in agreement with five pole-pairs of the rotor 3. This reduces the generation of radial vibration in the motor 10.

That is, while achieving the technical advantage of avoidance of or reduction in the generation of radial vibration, the configuration of the motor 10 increases interlinkage flux of the poles 31 and 33 of the rotor 3 to the armature windings 2b of the armature 2, making it possible to balance maintenance of torque-generation performance of the motor 10 and a reduction in size of the motor 10.

The motor 10 is configured such that the pitch between adjacent slots of the armature core 2 is set to 30 electrical degrees, which is an integer submultiple of 60 electrical degrees (see FIGS. 11 and 12). This configuration facilitates the design of the motor 10, and reliably generates repeatability of electrical degree of, for example, 30 electrical degrees, that a tooth 22 takes per rotation of 360 mechanical angle of the rotor 10, thus reducing noise due to increased radial vibration in the motor 10.

Particularly, the motor 10 is designed such that: the number of slots per pole in the armature 2 is set to two, the pitch between adjacent slots (adjacent teeth 22) of the armature core 2a is set to 30 electrical degrees, the number of teeth 22 facing each permanent magnet pole 31 is seven, and the number of teeth 22 facing each consequent pole 33 is five. This allows those skilled in the art to easily manufacture the motor 10.

The motor 10 is configured such that the five permanent magnet poles 31 are mounted on the outer periphery of the yoke 32 at circumferentially regular pitches therebetween. This configuration further facilitates manufacturing of the motor 10.

Figure 2:
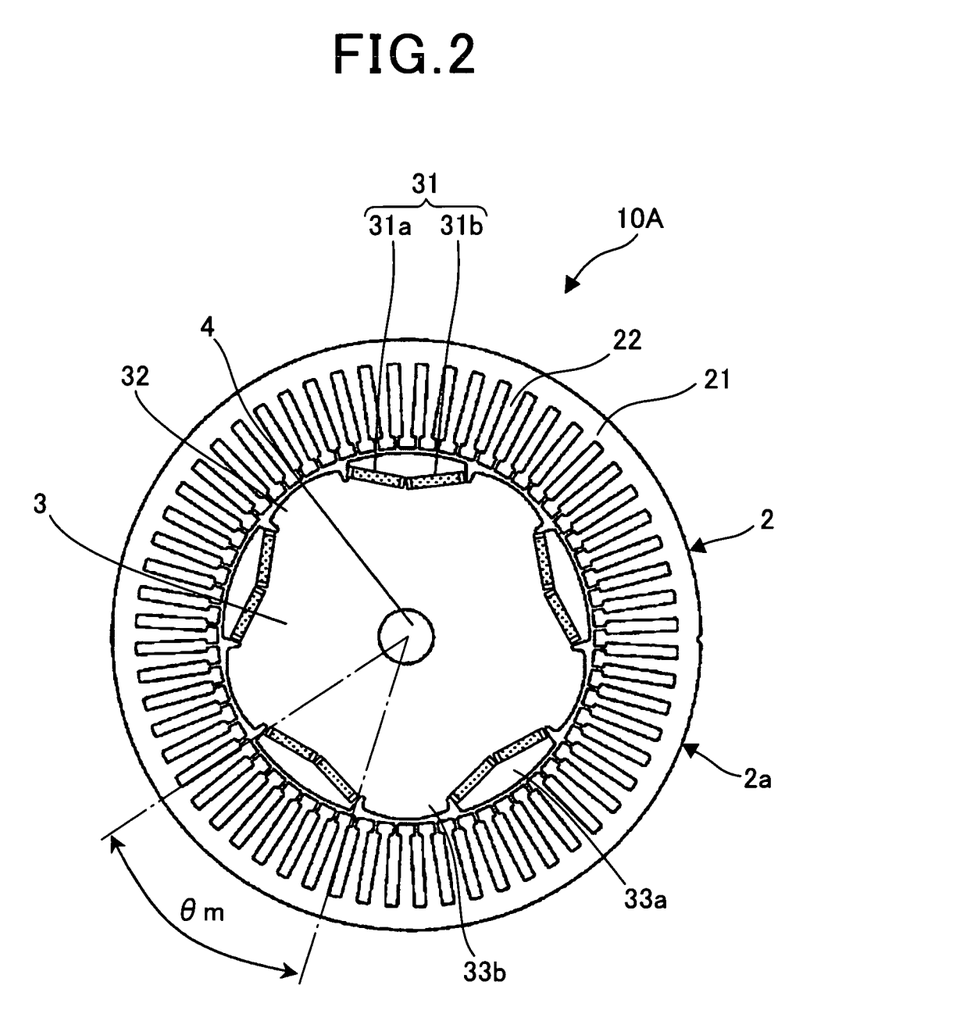
FIG. 2 is a lateral cross sectional view of a three-phase, 60-slot, 10-pole motor according to the first modification of the first embodiment of the present disclosure.

A motor 10A according to the first modification of the first embodiment is illustrated in FIG. 2. The structure and/or functions of the motor 10A according to the first modification are different from those of the motor 10 by the following points. So, the different points will be mainly described hereinafter.

As illustrated in FIG. 2, the yoke 32 is provided with five radially outwardly extending projections 33a and five radially outwardly extending projections 33b. A circumferential electrical angular width am of each of the five radially outwardly extending projections 33a is set to 207 electrical degrees longer than that of each of the five radially outwardly extending projections 33b. Each of the five radially outwardly extending portions 33a serve as a salient pole of the rotor 3.

The rotor 3 is also comprised of five pairs of permanent magnets 31a and 31b having a plate-like shape and the same magnetic polarity, such as the north or south pole. The permanent magnets 31a and 31b of each pair are embedded in a corresponding projection 33a to serve the corresponding projection 33a as a permanent magnet pole.

One major side of each of the permanent magnets 31a and 31b faces the inner periphery of the armature 2, and one edge of the permanent magnet 31a and that of the permanent magnet 31b of each pair are closely opposite to or in contact with each other.

As well as the first embodiment, the magnetic polarities of the five pairs of permanent magnet poles 31a and 31b cause the five projections 33b to be consequently magnetized as the same magnetic polarity opposite to the magnetic polarity of the five pairs of permanent magnet poles 31a and 31b; these projections 33b will be therefore referred to as "consequent poles 33b" hereinafter.

The configuration of the motor 10A according to the first modification of the first embodiment is capable of generating reluctance torque between each salient pole 33a of the rotor 3 and a corresponding pole of the continuous rotating magnetic field generated in the armature 2.

Thus, in addition to the technical advantages achieved in the first embodiment, the configuration of the motor 10A according to the first modification of the first embodiment makes it possible to reduce the amount of permanent magnet materials to be used for the permanent magnet poles 31 of the motor 10A as compared with the amount of permanent magnet materials to be used for the permanent magnet poles 31 of the motor 10 according to the first embodiment because the motor 10A can use the reluctance torque to rotate the rotor 3.

Figure 3:
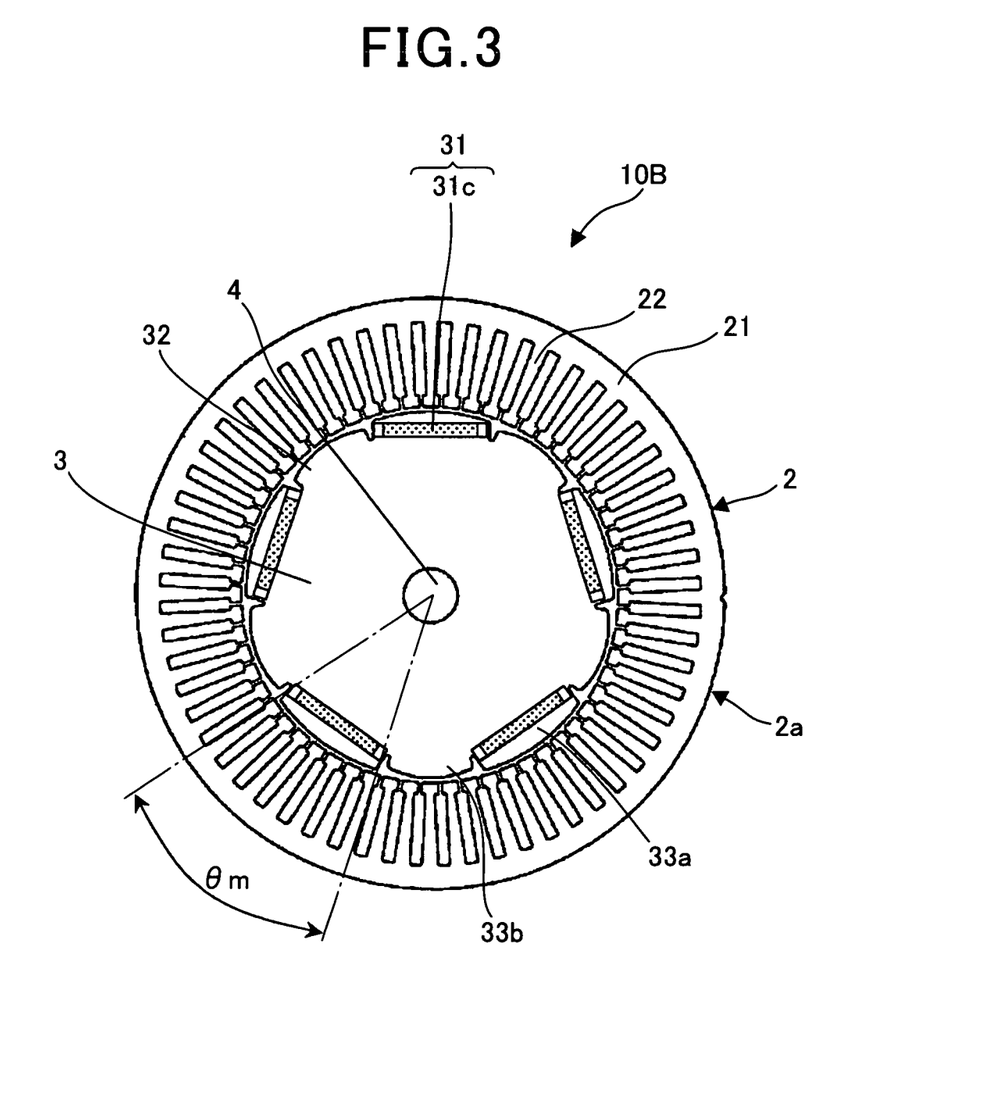
FIG. 3 is a lateral cross sectional view of a three-phase, 60-slot, 10-pole motor according to the second modification of the first embodiment of the present disclosure.

A motor 10B according to the second modification of the first embodiment is illustrated in FIG. 3. The structure and/or functions of the motor 10B according to the second modification are different from those of the motor 10A by the following points. So, the different points will be mainly described hereinafter.

As illustrated in FIG. 3, the rotor 3 is comprised of five permanent magnets 31c having a plate-like shape and the same magnetic polarity, such as the north or south pole. The permanent magnets 31c are embedded in the respective projections 33a to serve each of the projections 33a as a permanent magnet pole.

One major side of each permanent magnet 31c faces the inner periphery of the armature 2.

As well as the first modification, the magnetic polarities of the five permanent magnet poles 31c cause the five projections 33b to be consequently magnetized as the same magnetic polarity opposite to the magnetic polarity of the five permanent magnet poles 31c; these projections 33b will be therefore referred to as "consequent poles 33b" hereinafter.

The configuration of the motor 10B according to the second modification of the first embodiment is capable of generating reluctance torque between each salient pole 33a of the rotor 3 and a corresponding pole of the continuous rotating magnetic field generated in the armature 2.

Thus, in, addition to the technical advantages achieved in the first embodiment, the configuration of the motor 10B according to the second modification of the first embodiment makes it possible to reduce the amount of permanent magnet materials to be used for the permanent magnet poles 31 of the motor 10B as compared with the amount of permanent magnet materials to be used for the permanent magnet poles 31 of the motor 10 because the motor 10B can use the reluctance torque to rotate the rotor 3.

Second Embodiment

A motor 10-1 according to the second embodiment of the present disclosure will be described hereinafter with reference to FIGS. 4A and 4B. The structure and/or functions of the motor 10-1 according to the second embodiment are different from those of the motor 10 by the following points. So, the different points will be mainly described hereinafter.

Figure 4A:
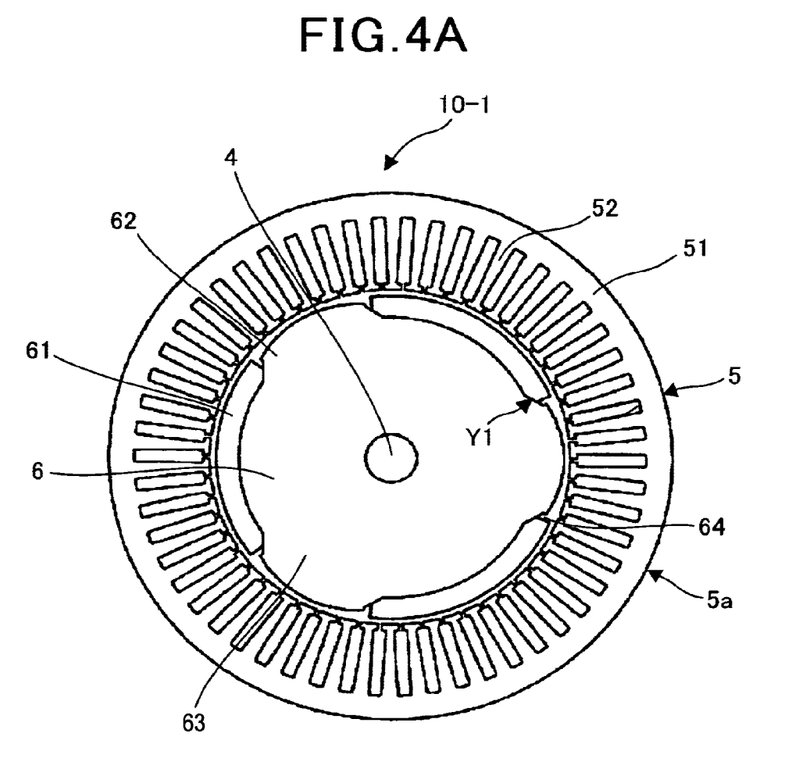
FIG. 4A is a lateral cross sectional view of a three-phase, 60-slot, 10-pole motor according to the second embodiment of the present disclosure.
Figure 4B:
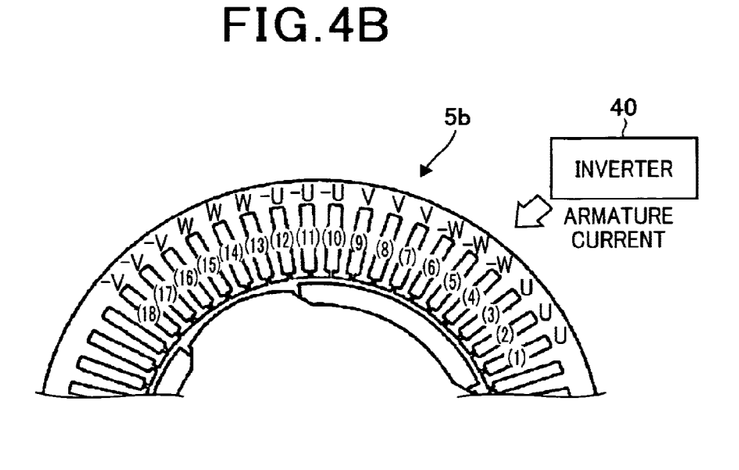
FIG. 4B is an enlarged cross sectional view of a part of the motor illustrated in FIG. 4A.

Referring to FIG. 4A, there is illustrated a three-phase, 54-slot, 6-pole motor 10-1 with a substantially cylindrical shape, referred to simply as a "motor 10-1".

The motor 10-1 is comprised of an armature and a substantially annular rotor 6.

The armature 5 includes a substantially annular armature core 5a. The armature core 5a consists of an annular yoke 51 and fifty-four teeth 52 radially inwardly projecting from the inner surface of the yoke 51. The fifty-four teeth 52 are circumferentially arranged at regular pitches therebetween. Spaces surrounded by circumferentially adjacent teeth and the yoke 51 provide fifty-four slots of the armature core 5a. The inner surfaces of the sixth teeth 52 provide the inner periphery of the armature core 5a.

The rotor 6 is made of a magnetic steel sheet as an example of soft magnetic materials, and is comprised of a substantially annular yoke (core) 62 with its inner periphery to which the rotary shaft 4 is fixed. The rotor 6 is comprised of three permanent magnet poles 61 made of, for example, rare-earth magnets. The three permanent magnet poles 61 have the same magnetic polarity, such as the north or south pole, and are mounted on the outer periphery of the yoke 62. The three permanent magnet poles 61 are circumferentially arranged at regular pitches therebetween. The outer surface of each of the permanent magnet poles 61 is curved with a predetermined radius of curvature around the center axis of the rotary shaft 4.

The yoke 62 is provided with three radially outwardly extending projections 63 disposed respectively between the three permanent magnet poles 61 and circumferentially arranged at regular pitches. With the configuration of the rotor 6, the magnetic polarities of the three permanent magnet poles 61 cause the three projections 63 to be consequently magnetized as the same magnetic polarity opposite to the magnetic polarity of the three permanent magnet poles 61; these projections 63 will be therefore referred to as "consequent poles 63" hereinafter. The yoke 62 is comprised of spaces 64 between the permanent magnet poles 61 and the consequent poles 63; these spaces 64 serve as magnetic barriers between the permanent magnet poles 61 and the consequent poles 63. The outer surface of each of the consequent poles 63 is curved with a predetermined radius of curvature around the center axis of the rotary shaft 4.

The rotor 6 has one pole-pair pitch of 120 mechanical degrees corresponding to 360 electrical degrees. As illustrated in FIGS. 4A and 4B, there are eighteen teeth 52 of the armature core 5a within 120 mechanical degrees corresponding to one pole-pair pitch of the rotor 5. The 54-slot, 6-pole motor 10-1 according to the second embodiment is configured such that there are eighteen teeth 52 within 120 mechanical degrees corresponding to one pole-pair pitch of the rotor 6, k is set to 9. Thus, the pitch between adjacent slots (adjacent teeth 22) of the armature core 2 is set to 20 electrical degrees.

The armature 5 also includes three-phase armature windings 5b (see FIG. 48) wound in the armature core 5a in distributed, full pitch winding configuration. As each of the three-phase armature windings 5b, the joint of a plurality of conductor segments each consisting of a pair of in-slot portions and a turn portion joining the paired in-slot portions or a continuous wire having a rectangular shape in its lateral cross section can be used.

For example, in one electric angular cycle (360 electrical degrees) of the armature core 5a, which corresponds to one pole-pair pitch of the rotor 6, including eighteen slots (1), (2), . . . , (18), a first U-phase coil is wound in the first slot (1) and the tenth slot (10), a second U-phase coil is wound in the second slot (2) and the eleventh slot (11), and a third U-phase coil is wound in the third slot (3) and the twelfth slot (12). The first, second, and third U-phase coils are, for example, connected in series to provide the U-phase winding.

Similarly, in one electric angular cycle (360 electrical degrees) of the armature core 5a, a first V-phase coil is wound in the seventh slot (7) and the sixteenth slot (16), a second V-phase coil is wound in the eighth slot (8) and the seventeenth slot (17), and a third V-phase coil is wound in the ninth, slot (9) and the eighteenth slot (18). The first, second, and third V-phase coils are, for example, connected in series to provide the V-phase winding.

In addition, in one electric angular cycle (360 electrical degrees) of the armature core 5a, a first W-phase coil is wound in the thirteenth slot (13) and the fourth slot (4), a second W-phase coil is wound in the fourteenth slot (14) and the fifth slot (5), and a third W-phase coil is wound in the fifteenth slot (15) and the sixth slot (6). The first, second, and third W-phase coils are, for example, connected in series to provide the W-phase winding.

As well as the first set of the slots (1) to (18), U-, V-, and W-phase windings 5b are wound in each of: the second set of the slots (19) to (36), and the third set of the slots (37) to (54). In other words, the armature windings 5b are classified into: the first group of armature windings wound in the first set of the slots (1) to (18), the second group of armature windings wound in the second set of the slots (19) to (36), and the third group of armature windings wound in the third set of the slots (37) to (54).

The armature currents (U-, V-, and V-phase alternating currents) have a phase difference of 120 degrees; these armature currents are supplied from the inverter 40. Applying one cycle (360 electrical degrees) of the armature currents to the first group of armature windings creates one cycle (360 electrical degrees) of a rotating magnetic field. In other words, the magnetic field created by the armature currents supplied to each group of armature windings rotates by 360 electrical degrees corresponding to the mechanical angle of 120 degrees. Thus, applying the armature currents sequentially to the respective first to third groups of armature windings creates a continuous rotating magnetic field having three pole-pairs around the armature core 5a (360 mechanical degrees).

Each of the first and second U-phase coils, the first and second V-phase coils, and the first and second W-phase coils can be individually driven as two pairs of three-phase windings by a pair of inverters.

Magnetic interaction between the continuous rotating magnetic field and the poles (the permanent magnet poles 61 and consequent poles 62) of the rotor 6 creates torque to turn the rotor 6.

The motor 10-1 according to the second embodiment is specially designed such that the number of teeth 52 facing each permanent magnet pole 61 is set to eleven equal to the sum of k and 2 and the number of teeth 52 facing each consequent pole 63 is set to six equal to the subtraction of 3 from k.

Particularly, in order to maximize interlinkage flux of the poles 61 and 63 of the rotor 6 to the armature windings 5b of the armature 5, the motor 10-1 is designed such that a circumferential electrical angular width θm of each of the permanent magnet poles 61 is set to 220 electrical degrees, and a circumferential electrical angular width θc of each of the consequent poles 63 is set to 130 electrical degrees. Thus, a circumferential electrical angular width of each of the magnetic barriers 64 is set to 10 electrical degrees.

How to determine the circumferential electrical angular width θm of each of the permanent magnet poles 61 and the circumferential electrical angular width θc of each of the consequent poles 63 in order to maximize interlinkage flux of the poles 61 and 63 of the rotor 6 to the armature windings 5*b* of the armature 5 are as follows.

Specifically, in the second embodiment, as the material of each of the permanent magnet poles 61, a rare-earth magnet with residual flux density Br of 1.2 Tesla [T], and, as the material of the yoke 62 of the rotor 6, a magnetic steel sheet having a saturation flux density Bst of 1.9 [T]. Note that, for maximizing interlinkage flux of poles 61 and 63 of the rotor 6 to the armature windings 5*b* of the armature 5, it is necessary to design the amount of magnetic flux passing through the permanent magnet poles 61 and the consequent poles 63 to its upper limit. The amount $\phi$m of magnetic flux generated from each permanent magnet pole 61 is proportional to the product of the circular angular width $\theta$m of a corresponding one permanent magnet pole 61 and the residual flux density Br, which is expressed as the following equation: $\phi m \propto \theta m \times Br$. Similarly, the amount of $\phi$s of magnetic flux generated from each consequent pole 63 is proportional to the product of the saturation flux density Bst and the subtraction of the circular angular width $\theta$m from 2$\Pi$, which is expressed as the following equation: $\phi s \propto (2\Pi - \theta m) \times Bst$.

In the second embodiment, because the material of each permanent magnet pole 61 with the residual flux density Br of 1.2 [T] and the material of each consequent magnet pole 63 with the saturation flux density Bst of 1.9 [T] are selected, a value of the circular angular width $\theta$m of each permanent magnet pole 61, which meets the equation of "$\phi m = \phi s$", is substantially calculated as 220 electrical degrees. As described above, because the magnetic barriers 64 are provided between the permanent magnet poles 61 and the consequent poles 63, the determination of the circumferential electrical angular width $\theta$m of each permanent magnet pole 61 to 220 electrical degrees determines the circular angular width Bs of each consequent pole 63 to 130 electrical degrees.

The configuration of the motor 10-1 set forth above increases the length of the outer surface of each permanent magnet pole 61 in the circumferential direction of the rotor 6 in comparison to a 54-slot, 6-pole motor whose number of teeth of the armature opposite to each magnet pole is identical to that of teeth opposite to each consequent pole by substantially 22 percent; this 22 percent is calculated by dividing 220 by 180.

Thus, it is possible to increase the amount of magnetic flux generated from each permanent magnet pole 61 of the motor 10-1 by substantially 22 percent in comparison to the amount of magnetic flux generated from each permanent magnet of a 54-slot, 6-pole motor whose number of teeth of the armature opposite to each magnet pole is identical to that of teeth opposite to each consequent pole.

In other words, if the amount of magnetic flux generated from each permanent magnet pole 61 of the motor 10-1 is designed to be in agreement with the amount of magnetic flux generated from each permanent magnet of a 54-slot, 6-pole motor (normal 54-slot, 6-pole motor) whose number of teeth of the armature opposite to each magnet pole is identical to that of teeth opposite to each consequent pole, the amount of permanent magnet materials to be used for the permanent magnet poles 61 of the motor 10-1 can be reduced as compared with the amount of permanent magnet materials to be used for the permanent magnet poles of the normal 54-slot, 6-pole motor. Otherwise, if the amount of magnetic flux generated from each permanent magnet pole 61 of the motor 10-1 is designed to be in agreement with the amount of magnetic flux generated from each permanent magnet of the normal 54-slot, 6-pole motor, it is possible to reduce the axial length of magnetic circuits between the armature 2 and the rotor 3, that is, the axial length of the motor 10 by 22 percent in comparison to the axial length of the normal 54-slot, 6-pole motor.

The motor 10-1 according to the second embodiment also can achieve substantially the same advantages as those of the motor 10 according to the first embodiment.

Particularly, the motor 10-1 is designed such that the number of slots per pole in the armature 5 is set to three, the pitch between adjacent slots of the armature core 5*a* is set to 20 electrical degrees, the number of teeth 52 facing each permanent magnet pole 61, is ten, and the number of teeth 52 facing each consequent pole 63 is eight. This allows those skilled in the art to easily manufacture the motor 10-1.

Third Embodiment

Figure 5:
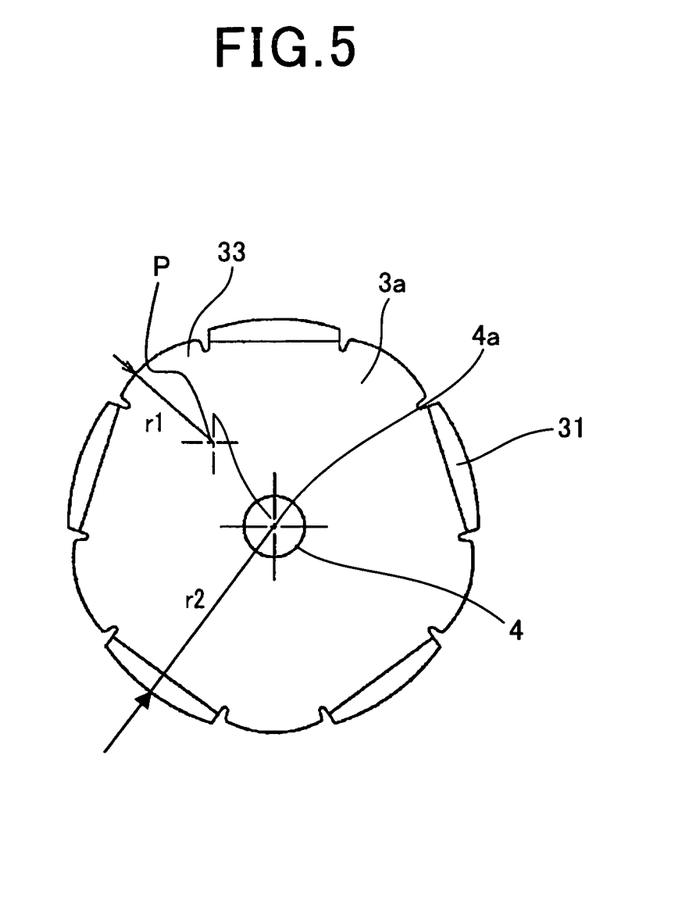
FIG. 5 is a lateral cross sectional view of the rotor of a three-phase, 60-slot, and 10-pole motor according to the third embodiment of the present disclosure.

A motor 10-2 according to the third embodiment of the present disclosure will be described hereinafter with reference to FIG. 5. The structure and/or functions of the motor 10-2 according to the third embodiment are different from those of the motor 10 by the following points. So, the different points will be mainly described hereinafter.

The motor 10 according to the first embodiment is configured such that the radius of curvature of each permanent magnet pole 31 from the center axis of the rotary shaft 4 is identical to that of each consequent pole 33 from the center axis of the rotary shaft 4.

However, the motor 10-2 according to the third embodiment is designed such that a radius r1 of curvature of the outer surface of each consequent pole 33 is defined from a center point P located radially outside of the center axis of the rotary shaft 4. Because a radius r2 of curvature of the outer surface of each permanent magnet pole 31 is defined from the center axis of the rotary shaft 4, the design of the motor 10-2 reduces the radius r1 of curvature of the outer surface of each consequent pole 33 as compared with the radius r2 of curvature of the outer surface of each permanent magnet pole 31. The design of the motor 10-2 therefore reduces cogging torque of the motor 10-2.

The inventors carried out experiments to measure the ratio of reduction of the magnitude of cogging torque to the magnitude of cogging torque measured when the ratio of the radius r1 of curvature of the outer surface of each consequent pole 33 to the radius r2 of curvature of the outer surface of each permanent magnet pole 31 is set to 1.0 while changing the ratio of the radius r1 of curvature of the outer surface of each consequent pole 33 to the radius r2 of curvature of the outer surface of each permanent magnet pole 31. The ratio of reduction of the magnitude of cogging torque to the magnitude of cogging torque measured when the ratio (ra1) of the radius r1 of curvature of the outer surface of each consequent pole 33 to the radius r2 of curvature of the outer surface of each per magnet pole 31 is set to 1.0 will be referred to as a "reference magnitude of cogging torque".

Figure 6:
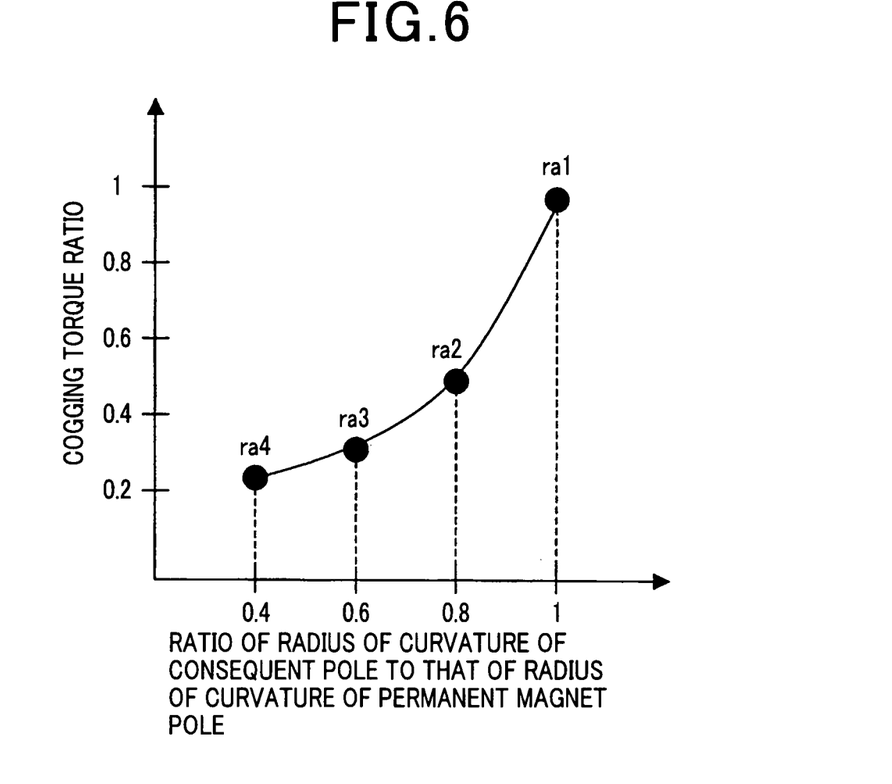
FIG. 6 is a graph schematically illustrating a correlation between each of measured values of the ratio of reduction of the magnitude of cogging torque to a reference magnitude of cogging torque when the reference magnitude of cogging torque is normalized to 1.0 according to the third embodiment.

FIG. 6 shows the correlation between each of the measured values of the ratio of reduction of the magnitude of cogging torque to the reference magnitude of cogging torque when the reference magnitude of cogging torque is normalized to 1.0.

The first measured value of the ratio of reduction of the magnitude of cogging torque to the reference magnitude of cogging torque corresponds to the ratio (ra2) of 0.8 of the radius r1 of curvature of the outer surface of each consequent pole 33 to the radius r2 of curvature of the outer surface of each permanent magnet pole 31.

The second measured value of the ratio of reduction of the magnitude of cogging torque to the reference magnitude of cogging torque corresponds to the ratio (ra3) of 0.6 of the radius r1 of curvature of the outer surface of each consequent pole 33 to the radius r2 of curvature of the outer surface of each permanent magnet pole 31.

The third measured value of the ratio of reduction of the magnitude of cogging torque to the reference magnitude of cogging torque corresponds to the ratio (ra4) of 0.4 of the radius r1 of curvature of the outer surface of each consequent pole 33 to the radius r2 of curvature of the outer surface of each permanent magnet pole 31.

As illustrated in FIG. 6, the lower the ratio of the radius r1 of curvature of the outer surface of each consequent pole 33 to the radius r2 of curvature of the outer surface of each permanent magnet pole 31 is, the more the magnitude of cogging torque is reduced. That is, the configuration of the motor 10-2 according to the third embodiment reduces the magnitude of cogging torque as compared with the configuration of the motor 10 according to the first embodiment.

In each of the first and third embodiments, each of the permanent magnet poles 31 has a substantially semicylindrical shape extending in parallel to the axial direction of the rotary shaft 4. Each of the permanent magnet poles 31 has an inner surface, which is at least partly flat (see the arrow Y1 in FIG. 1), opposite to the curved outer surface thereof. At least a part of the outer periphery of the yoke 32 on which the flat portion of the inner surface of each of the permanent magnet poles 31 is mounted is formed flat.

The configuration of each of the permanent magnet poles 31 facilitates the positioning of each of the permanent magnet poles 31 in mounting it on a corresponding part of the outer periphery of the yoke 32, and/or the form of a permanent magnet material into each of the permanent magnet poles 31, making it possible to achieve greater manufacturing efficiencies of the motor 10.

Similarly, in the second embodiment, each of the permanent magnet poles 61 has a plate-like shape extending in parallel to the axial direction of the rotary shaft 4 and having a substantially arcuate shape in its lateral cross section orthogonal to the axial direction of the rotary shaft 4. Each of the permanent magnet poles 61 has a curved inner surface, at least one lateral edge of which is flat (see the arrow Y1 in FIG. 4), opposite to the curved outer surface thereof. At least a part of the outer periphery of the yoke 32 on which the at least one lateral flat end of the curved inner surface of each of the permanent magnet poles 61 is mounted is formed flat.

The configuration of each of the permanent magnet poles 61 facilitates the positioning of each of the permanent magnet poles 61 in mounting it on a corresponding part of the outer periphery of the yoke 62, and/or the form of a permanent magnet material into each of the permanent magnet poles 61, making it possible to achieve greater manufacturing efficiencies of the motor 10-1.

The number of poles of a rotor and the number of teeth of an armature are not limited to each of the motors 10, 10A, 10B, 10-1, and 10-2 according to the first to third embodiments and their modifications. Specifically, various combinations between the number of poles of a rotor and the number of teeth of an armature with a distributed, full pitch winding configuration can be included in the scope of the present disclosure. In addition, as illustrated in FIGS. 2 and 3, each of the permanent magnet poles 31 and 61 is mounted on the outer periphery of a corresponding one of the yokes 32 and 62, but can be embedded in a corresponding one of the yokes 32 and 62.

As described above, the ratio of the length of the outer surface of each permanent magnet pole 31 in the circumferential direction of the rotor 3 to the length of the outer surface of each consequent pole 33 in the circumferential direction of the rotor 3 is equal to the ratio of the saturation flux density Bst of the material of each of the consequent poles 33 to the residual flux density Br of the material of each of the permanent magnet poles 31.

This relationship allows, after selection of the material of each permanent magnet pole 31 and that of each consequent pole 33, the length of the outer surface of each permanent magnet pole 31 and that of the outer surface of each consequent pole 33 in the circumferential direction of the rotor 3 to be uniquely designed.

Because the saturation flux density Bst of a soft magnetic material to be used for each consequent pole 33 is generally greater than the residual flux density Br of a permanent magnet to be used for each permanent magnet pole 31, which can be expressed as "Bst>Br". For example, as described in the first embodiment, using the material of each consequent magnet pole 33 with the saturation flux density Bst of 1.9 [T] and the material of each permanent magnet pole 31 with the residual flux density Br of 1.4 [T] allows the circular angular width θm of each permanent magnet pole 31 to be uniquely designed as 207 electrical degrees. As another example, as described in the second embodiment, using the material of each consequent magnet pole 33 with the saturation flux density Bst of 1.9 [T] and the material of each permanent magnet pole 31 with the residual flux density Br of 1.2 [T] allows the circular angular width θm of each permanent magnet pole 31 to be uniquely designed as 220 electrical degrees.

Note that the sum of the number of teeth facing each permanent magnet pole 31 (61) and the number of teeth facing each consequent pole 33 (63) can be different from 2k.

Figure 7:
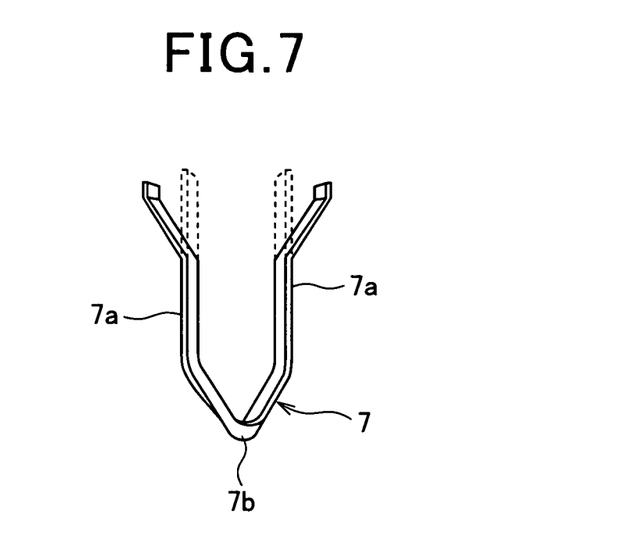
FIG. 7 is an enlarged perspective view of a conductor segment to be used for armature windings of a motor according to the third modification of the first embodiment.
Figure 8:
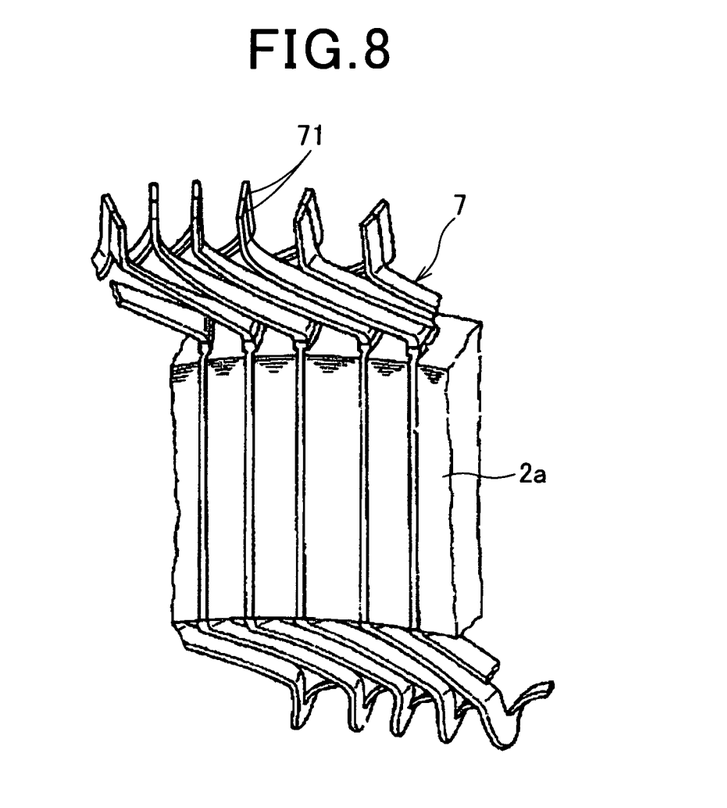
FIG. 8 is an enlarged perspective view of a part of the motor according to the third modification of the first embodiment.

FIGS. 7 and 8 schematically illustrate the third modification of the first embodiment. The third modification specifically shows an example of the joint of a plurality of conductor segments used as each of the three-phase armature windings 2b wound in the armature core 2a in distributed, full pitch winding configuration.

As illustrated in FIG. 7, the plurality of conductor segments 7 are provided. Each of the plurality of conductor segments 7 consists of a pair of in-slot portions 7a and a U- or V-shaped turn portion 7b such that the in-slot portions 7a extending at their one ends from ends of the turn portion 7b. Before installation of each conductor segment 7 in the armature core 2a, the other end of each of the in-slot portions 7a straightly extends.

One of the in-slot portions 7a of one conductor segment 7 is inserted into a corresponding slot of the armature core 2a, and the other of the in-slot portions 7a is inserted into a corresponding slot of the armature core 2a from the bottom of the paper of FIG. 8 so that the other ends of the in-slot portions 7a project from the corresponding slots of the armature core 2a. These other ends of the in-slot portions 7a projecting out of the corresponding slots (the armature core 2a) will be referred to as "projecting end portions" hereinafter.

Thereafter, each of the projecting end portions of the one conductor segment 7 is bent to be inclined outward by a predetermined electric angle with respect to the axial direction of a corresponding slot. After the bending, a tip end of each of the projecting end portions of the conductor segment 7 is joined by welding (see reference character 71 in FIG. 8) to a tip end of a corresponding one of the projecting end portions of an alternative conductor segment 7 inserted in corresponding slots in the same manner as the one conductor segment 7.

That is, the plurality of conductor segments 7 are inserted into corresponding slots of the armature core 2a, the projecting end portions of each of the inserted conductor segments 7 are bent, and a tip end of each of the projecting end portions of each of the conductor segments 7 is joined by welding to a tip end of a corresponding one of the projecting end portions of a corresponding one of the inserted conductor segments 7. This provides the three-phase armature windings 2b, each of which consists of the joint of a number of conductor segments 7, wound in the armature core 2a in distributed, full pitch winding configuration.

This winding configuration allows the coil ends of the armature windings to be aligned in, for example, the circumferential and radial direction of the motor 10. This makes it possible to reduce the motor 10 in size. Usually, motors whose armature windings have distributed winding configuration may generally increase the length of the coil ends of the armature windings, deteriorating the downsizing of the motors. However, the motor 10 whose armature windings 2b each consists of the joint of a plurality of conductor segments prevents the length of the coil ends of the armature windings from being increased.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A motor comprising:
   an annular rotor member made of a soft magnetic material and rotatably provided in the motor, the rotor member comprising:
      a plurality of first magnetic poles arranged in a circumferential direction of the rotor member at spaces therebetween, each of the plurality of first magnetic poles being formed by an outer peripheral portion of the rotor member and a permanent magnet, the plurality of first magnetic poles having a same first magnetic polarity; and
   a plurality of second magnetic poles radially extending from the rotor member and respectively arranged between the plurality of first magnetic poles, the plurality of second magnetic poles being consequently magnetized as a plurality of consequent poles by the plurality of first magnetic poles, the plurality of second magnetic poles having a same second magnetic polarity that is opposite to the first magnetic polarity; and
   an armature provided to be opposite to the rotor member for generating a rotating magnetic field, the armature comprising:
      plural sets of teeth arranged in a direction of rotation of the rotor member such that each set of teeth in the plural sets of teeth is within one electrical angular cycle of the rotating magnetic field, the one electrical angular cycle corresponding to one pole-pair pitch of the annular rotor member,
   a number of teeth in the plural sets of teeth within the one pole-pair pitch being set to 2k (k is a natural number), a number of teeth facing each of the first magnetic poles in the plurality of teeth being set to be equal to or greater than the sum of k and 1.

2. The motor according to claim 1, wherein each of the plurality of first magnetic poles is configured such that the permanent magnet is mounted on an outer surface of the outer peripheral portion of the rotor member.

3. The motor according to claim 2, wherein:
   the permanent magnet of each of the plurality of first magnetic poles has a first surface that is radially inward from a second surface,
   the permanent magnet of each of the plurality of first magnetic poles is mounted at the first surface on the outer surface of the outer peripheral portion of the rotor member, and
   at least a part of the first surface is flat.

4. The motor according to claim 1, wherein each of the plurality of first magnetic poles is configured such that the permanent magnet is provided inside the outer peripheral portion of the rotor member.

5. The motor according to claim 1, wherein the number of teeth facing each of the second magnetic poles in the plural sets of teeth is set to be equal to or lower than a subtraction of 1 from k.

6. The motor according to claim 1, wherein a pitch between adjacent teeth in the plural sets of teeth is set to an integer submultiple of 60 electrical degrees.

7. The motor according to claim 6, wherein the teeth of the plural sets are arranged in the direction of rotation of the rotor member at regular spaces, the spaces being a plurality of slots, a number of slots per pole in the armature is set to two, the pitch between adjacent teeth in the plural sets of teeth is set to 30 electrical degrees, the number of teeth facing each of the first magnetic poles in the plural sets of teeth is set to seven, and a number of teeth facing each of the second magnetic poles in the plural sets of teeth is set to five.

8. The motor according to claim 6, wherein the teeth of the plural sets are arranged in the direction of rotation of the rotor member at regular spaces, the spaces being a plurality of slots, a number of slots per pole in the armature is set to three, the pitch between adjacent teeth in the plural sets of teeth is set to 20 electrical degrees, the number of teeth facing each of the first magnetic poles in the plural sets of teeth is set to ten, and a number of teeth facing each of the second magnetic poles in the plural sets of teeth is set to eight.

9. The motor according to claim 1, wherein each of the plurality of second magnetic poles has a curved outer surface with a predetermined first radius of curvature around a center point located radially outside of an axis of rotation of the rotor member.

10. The motor according to claim 1, wherein each of the plurality of first magnetic poles has a curved outer surface with a predetermined second radius of curvature greater than the first radius of curvature.

11. The motor according to claim 1, wherein, when the permanent magnet of each of the plurality of first magnetic poles has a residual flux density of Br, and the soft magnetic material has a saturation flux density of Bst, a ratio of a circumferential angular width of an outer surface of each of the plurality of first magnetic poles to a circumferential angular width of an outer surface of each of the plurality of second magnetic poles is substantially equal to a ratio of the saturation flux density of Bst to the residual flux density of Br.

12. The motor according to claim 1, further comprising a rotary shaft made of a nonmagnetic material and attached to the rotor member.

13. The motor according to claim 1, wherein the teeth of the plural sets are arranged in the direction of rotation of the rotor member at regular spaces, the spaces being a plurality of slots, the armature comprises multiphase armature windings wound in the plurality of slots for generating the rotating magnetic field when energized, each of the multiphase armature windings being a joint of a plurality of conductor segments, each of the plurality of conductor segments comprises: a pair of in-slot portions inserted in corresponding slots in the plurality of slots, and a U- or V-shaped turn portion connecting the pair of in-slot portions.

14. A motor comprising:
an annular rotor member made of a soft magnetic material and rotatably provided in the motor, the rotor member comprising:
a plurality of first magnetic poles arranged in a circumferential direction of the rotor member at spaces therebetween, each of the plurality of first magnetic poles being formed by an outer peripheral portion of the rotor member and a permanent magnet; and
a plurality of second magnetic poles radially extending from the rotor member and respectively arranged between the plurality of first magnetic poles, the plurality of second magnetic poles being consequently magnetized as a plurality of consequent poles by the plurality of first magnetic poles; and
an armature provided to be opposite to the rotor member for generating a rotating magnetic field, the armature comprising:
plural sets of teeth arranged in a direction of rotation of the rotor member such that each set of teeth in the plural sets of teeth is within one electrical angular cycle of the rotating magnetic field, the one electrical angular cycle corresponding to one pole-pair pitch of the annular rotor member,
a number of teeth in the plural sets of teeth within the one pole-pair pitch being set to 2k (k is a natural number), a number of teeth facing each of the first magnetic poles in the plurality of teeth being set to be equal to or greater than the sum of k and 1,
wherein a pitch between adjacent teeth in the plural sets of teeth is set to an integer submultiple of 60 electrical degrees, and
wherein the teeth of the plural sets are arranged in the direction of rotation of the rotor member at regular spaces, the spaces being a plurality of slots, a number of slots per pole in the armature is set to two, the pitch between adjacent teeth in the plural sets of teeth is set to 30 electrical degrees, the number of teeth facing each of the first magnetic poles in the plural sets of teeth is set to seven, and a number of teeth facing each of the second magnetic poles in the plural sets of teeth is set to five.

15. A motor comprising:
an annular rotor member made of a soft magnetic material and rotatably provided in the motor, the rotor member comprising:
a plurality of first magnetic poles arranged in a circumferential direction of the rotor member at spaces therebetween, each of the plurality of first magnetic poles being formed by an outer peripheral portion of the rotor member and a permanent magnet; and
a plurality of second magnetic poles radially extending from the rotor member and respectively arranged between the plurality of first magnetic poles, the plurality of second magnetic poles being consequently magnetized as a plurality of consequent poles by the plurality of first magnetic poles; and
an armature provided to be opposite to the rotor member for generating a rotating magnetic field, the armature comprising:
plural sets of teeth arranged in a direction of rotation of the rotor member such that each set of teeth in the plural sets of teeth is within one electrical angular cycle of the rotating magnetic field, the one electrical angular cycle corresponding to one pole-pair pitch of the annular rotor member,
a number of teeth in the plural sets of teeth within the one pole-pair pitch being set to 2k (k is a natural number), a number of teeth facing each of the first magnetic poles in the plurality of teeth being set to be equal to or greater than the sum of k and 1,
wherein a pitch between adjacent teeth in the plural sets of teeth is set to an integer submultiple of 60 electrical degrees, and
wherein the teeth of the plural sets are arranged in the direction of rotation of the rotor member at regular spaces, the spaces being a plurality of slots, a number of slots per pole in the armature is set to three, the pitch between adjacent teeth in the plural sets of teeth is set to 20 electrical degrees, the number of teeth facing each of the first magnetic poles in the plural sets of teeth is set to ten, and a number of teeth facing each of the second magnetic poles in the plural sets of teeth is set to eight.

* * * * *